US010243736B2

(12) United States Patent
Yamaguchi

(10) Patent No.: US 10,243,736 B2
(45) Date of Patent: Mar. 26, 2019

(54) CRYPTOGRAPHIC SYSTEM, UPDATING METHOD, AND NON-TRANSITORY STORAGE MEDIUM ENCODED WITH COMPUTER READABLE PROGRAM

(71) Applicant: Konica Minolta, Inc., Chiyoda-ku, Tokyo (JP)

(72) Inventor: Toshinobu Yamaguchi, Takarazuka (JP)

(73) Assignee: KONICA MINOLTA, INC., Tokyo (JP)

( * ) Notice: Subject to any disclaimer, the term of this patent is extended or adjusted under 35 U.S.C. 154(b) by 27 days.

(21) Appl. No.: 15/177,514

(22) Filed: Jun. 9, 2016

(65) Prior Publication Data

US 2016/0365976 A1 Dec. 15, 2016

(30) Foreign Application Priority Data

Jun. 12, 2015 (JP) ................................ 2015-119406

(51) Int. Cl.
*H04L 9/06* (2006.01)
*H04L 9/08* (2006.01)

(52) U.S. Cl.
CPC .......... *H04L 9/0891* (2013.01); *H04L 9/0894* (2013.01); *H04L 2209/12* (2013.01)

(58) Field of Classification Search
CPC ....... H04L 9/0891; H04L 9/06; H04L 9/0894; H04L 2209/12
See application file for complete search history.

(56) References Cited

U.S. PATENT DOCUMENTS

| 2003/0094499 A1* | 5/2003 | Endo ........................ G06F 7/48 235/492 |
| 2004/0122975 A1* | 6/2004 | Lennestal ............. H04L 63/065 709/245 |

(Continued)

FOREIGN PATENT DOCUMENTS

| JP | 10020779 A | 1/1998 |
| JP | 2003152703 A | 5/2003 |

(Continued)

OTHER PUBLICATIONS

Notice of Grounds of Rejection for corresponding JP Application No. 2015-119406; dated Jun. 13, 2017.

(Continued)

*Primary Examiner* — Samson Lemma
*Assistant Examiner* — Arya Golriz
(74) *Attorney, Agent, or Firm* — Cantor Colburn LLP

(57) ABSTRACT

A cryptographic system that can prevent encryption and decryption processes from being inefficient as an encryption key is updated is provided. The cryptographic system includes: a first encryption unit for encrypting original data in a first encryption method using a main key to generate first encrypted data; a second encryption unit for encrypting the first encrypted data in a second encryption method using a sub key to generate second encrypted data; a database for storing the second encrypted data generated; a key update unit for updating the current version of the main key to a new version of the main key and updating the current version of the sub key to a new version of the sub key; and a data update unit for converting the second encrypted data encrypted with the current version of the sub key into a state encrypted with the new version of the sub key.

13 Claims, 12 Drawing Sheets

(56) References Cited

U.S. PATENT DOCUMENTS

2009/0262927 A1* 10/2009 Hinaga ................. H04L 9/0891
380/45
2016/0004455 A1* 1/2016 Iwasa ..................... G06F 3/0608
711/112

FOREIGN PATENT DOCUMENTS

| JP | 2005135003 A | 5/2005 |
| JP | 2006222944 A | 8/2006 |
| JP | 2007259279 A | 10/2007 |
| JP | 2009506405 A | 2/2009 |
| JP | 2014017763 A | 1/2014 |
| JP | 2015002409 A | 1/2015 |

OTHER PUBLICATIONS

JP Final Decision for Rejection corresponding to Application No. 2015-119406; dated Feb. 6, 2018.

* cited by examiner

CRYPTOGRAPHIC SYSTEM, UPDATING METHOD, AND NON-TRANSITORY STORAGE MEDIUM ENCODED WITH COMPUTER READABLE PROGRAM

This application is based on Japanese Patent Application No. 2015-119406, filed with the Japan Patent Office on Jun. 12, 2015, the entire content of which is hereby incorporated by reference.

BACKGROUND OF THE INVENTION

Field of the Invention

This disclosure relates to a cryptographic system which manages encrypted data, a method of updating a key used in encrypting data, and a program to update that key.

Description of the Related Art

In recent years, cloud services are widely spread. By use of cloud services, a service provided to employees by an in-house system is inexpensively provided by a server on the cloud, for example. In an in-house system, an in-house operator manages a database, and a risk of information leaking outside is limited. In cloud services, a database in a server may be read by an operator of a third party, and there is a risk of information leaking outside. Accordingly, it is desirable that security data in a cloud server be managed in an encrypted form.

Regarding such a cryptographic technique, Japanese Laid-Open Patent Publication No. 2014-17763 discloses a technique to update an encryption while alleviating a load of a device on the side of a user desiring updating the encryption without providing an administrator of a database having encrypted data stored therein with plaintext, decrypting information and the like.

Generally, when data is encrypted, an encryption key (hereinafter also referred to as a "key") is used. In terms of security, it is preferable that the key is periodically updated. When the key is updated, it is necessary to re-encrypt a database in accordance with the updated key.

The re-encryption process is performed by a client connected to a cloud server via a network, for example. More specifically, the client obtains data from the cloud server, decrypts that data with a pre-update key, re-encrypts that data with a post-update key, and stores that data to the cloud server. When millions of data are managed on a database, the re-encryption process may take time and interfere with provision of services.

Japanese Laid-Open Patent Publication No. 2014-17763 discloses a technique such that whenever a new encryption key is created, encrypted data is encrypted with the new encryption key. Thus, this technique encrypts data with encryption keys manyfold and accordingly, it takes time to decrypt the data. Furthermore, the size of the data increases whenever the encryption key is updated.

SUMMARY OF INVENTION

The present disclosure has been made to solve the above problem, and an object in an aspect is to provide a cryptographic system that can prevent encryption and decryption processes from being inefficient as an encryption key is updated. An object in another aspect is to provide a key updating method that can prevent encryption and decryption processes from being inefficient as an encryption key is updated. An object in still another aspect is to provide a key updating program that can prevent encryption and decryption processes from being inefficient as an encryption key is updated.

According to one aspect a cryptographic system comprises: a first encryption unit for encrypting original data in a first encryption method using a first key to generate first encrypted data; a second encryption unit for encrypting the first encrypted data in a second encryption method using a second key to generate second encrypted data; a data storage unit for storing the second encrypted data generated; a key update unit for updating a current version of the first key to a new version of the first key and updating a current version of the second key to a new version of the second key, in response to an instruction received to update the current version of the first key and the current version of the second key; and a data update unit for converting, when the current version of the second key is updated, the second encrypted data encrypted with the current version of the second key into a state encrypted with the new version of the second key.

According to another aspect, a method for updating a key comprises: encrypting original data in a first encryption method using a first key to generate first encrypted data; encrypting the first encrypted data in a second encryption method using a second key to generate second encrypted data; storing the second encrypted data generated; in response to an instruction received to update a current version of the first key and a current version of the second key, updating the current version of the first key to a new version of the first key and also updating the current version of the second key to a new version of the second key; and when updating the current version of the second key, converting the second encrypted data encrypted with the current version of the second key into a state encrypted with the new version of the second key.

According to still another aspect, a non-transitory storage medium encoded with a computer readable program is provided. The program causes a computer to: encrypt original data in a first encryption method using a first key to generate first encrypted data; encrypt the first encrypted data in a second encryption method using a second key to generate second encrypted data; store the second encrypted data generated; in response to an instruction received to update a current version of the first key and a current version of the second key, update the current version of the first key to a new version of the first key and also update the current version of the second key to a new version of the second key; and when updating the current version of the second key, convert the second encrypted data encrypted with the current version of the second key into a state encrypted with the new version of the second key.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereafter, reference will be made to the drawings to describe each embodiment according to the present invention. In the following description, identical parts and components are identically denoted. Their names and functions are also identical. Accordingly, they will not be described repeatedly. Note that each embodiment and each exemplary variation described below may selectively be combined together as appropriate.

<Related Art>

Figure 1:
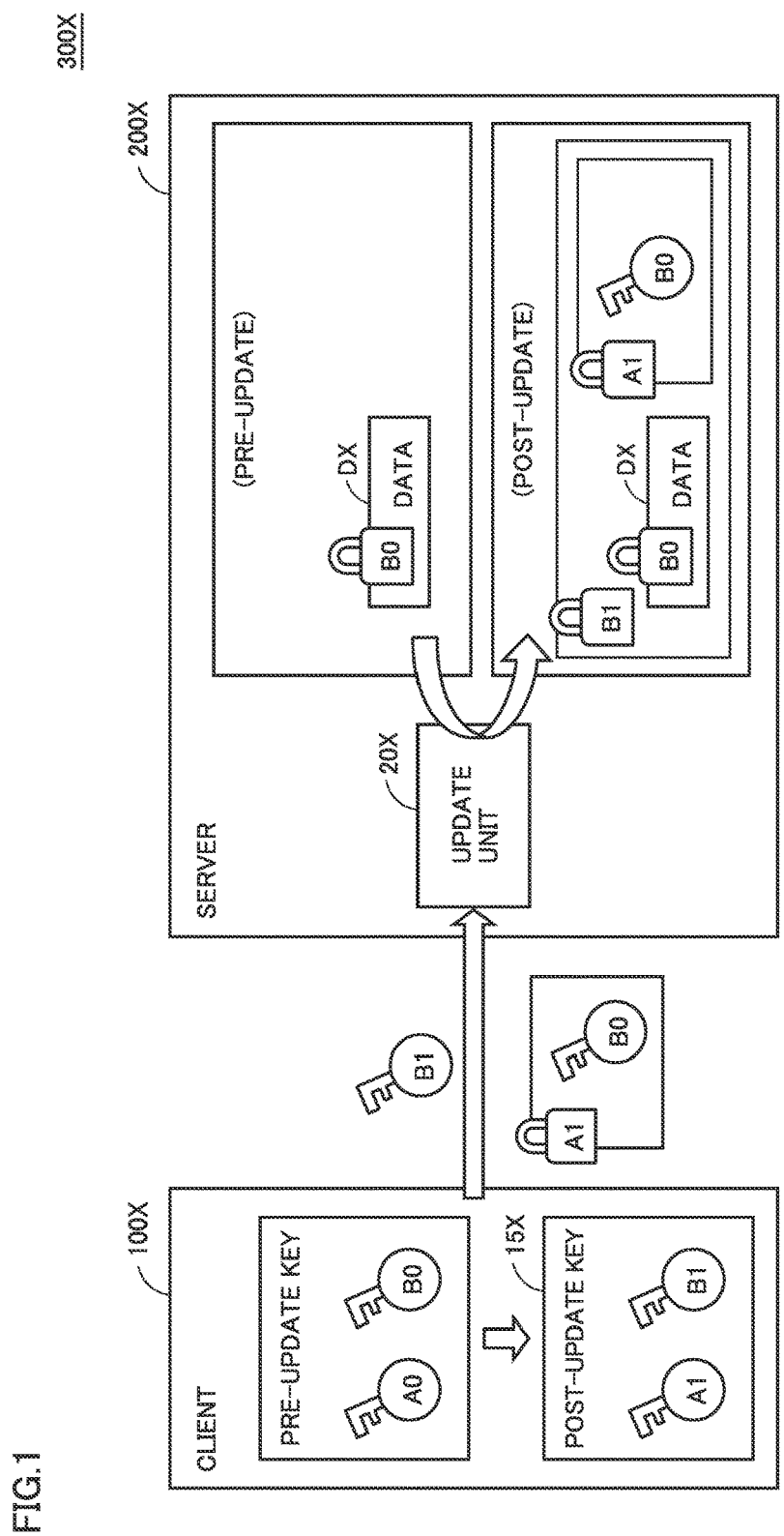
FIG. 1 is a conceptual diagram schematically showing a process for updating an encryption key by a cryptographic system according to a related art.

Initially, in order to help to better understand each following embodiment, reference will be made to FIG. 1 to describe a cryptographic system 300X according to a related art. FIG. 1 is a conceptual diagram schematically showing a process for updating an encryption key by cryptographic system 300X. As shown in FIG. 1, cryptographic system 300X includes a client 100X and a server 200X which are connected to each other on a network.

When client 100X receives data to be encrypted, client 100X encrypts the data in two steps. Hereinafter, an encryption key used in an encryption process performed in the first step will also be called a "main key." An encryption key used in an encryption process performed in the second step will also be called a "sub key." Client 100X encrypts the data to be encrypted with a main key A0, and, furthermore, encrypts the data that is obtained by this encryption with a sub key B0. Client 100X transmits data DX encrypted with main key A0 and sub key B0 to server 200X. Server 200X stores data DX received from client 100X.

When client 100X receives an instruction to update main key A0 and sub key B0, client 100X creates a new main key A1 substituting for current, main key A0, and also creates a new sub key B1 substituting for current, sub key B0. Client 100X transmits new main key A1 and sub key B1 to server 200X, and also transmits pre-update, sub key B0 encrypted with main key A1 to server 200X. Server 200X receives main key A1 and sub key B1 at an update unit 20X, and, in response, further encrypts data DX encrypted with sub key B0 and sub key B0 encrypted with main key A1 using sub key B1. Thus, server 200 updates a key without decrypting data DX, and a risk of the contents of data DX leaking to an administrator of server 200X is limited.

Cryptographic system 300X encrypts data DX with a new sub key whenever a key is updated, and cryptographic system 300X stores a pre-update sub key successively. Accordingly, the size of the data on server 200X increases whenever a key is updated. Furthermore, decrypting data DX requires sequentially decrypting data DX as the data is encrypted manyfold with sub keys, and accordingly, the more often a key is updated, the more time the decryption process takes.

A cryptographic system 300 according to an embodiment described hereinafter can solve these problems. More specifically, cryptographic system 300 prevents a server from having data increased in size whenever a key is updated, and cryptographic system 300 also prevents a decryption process from being inefficient as a result of that updating process.

<First Embodiment>

[Data Structure]

Figure 2:
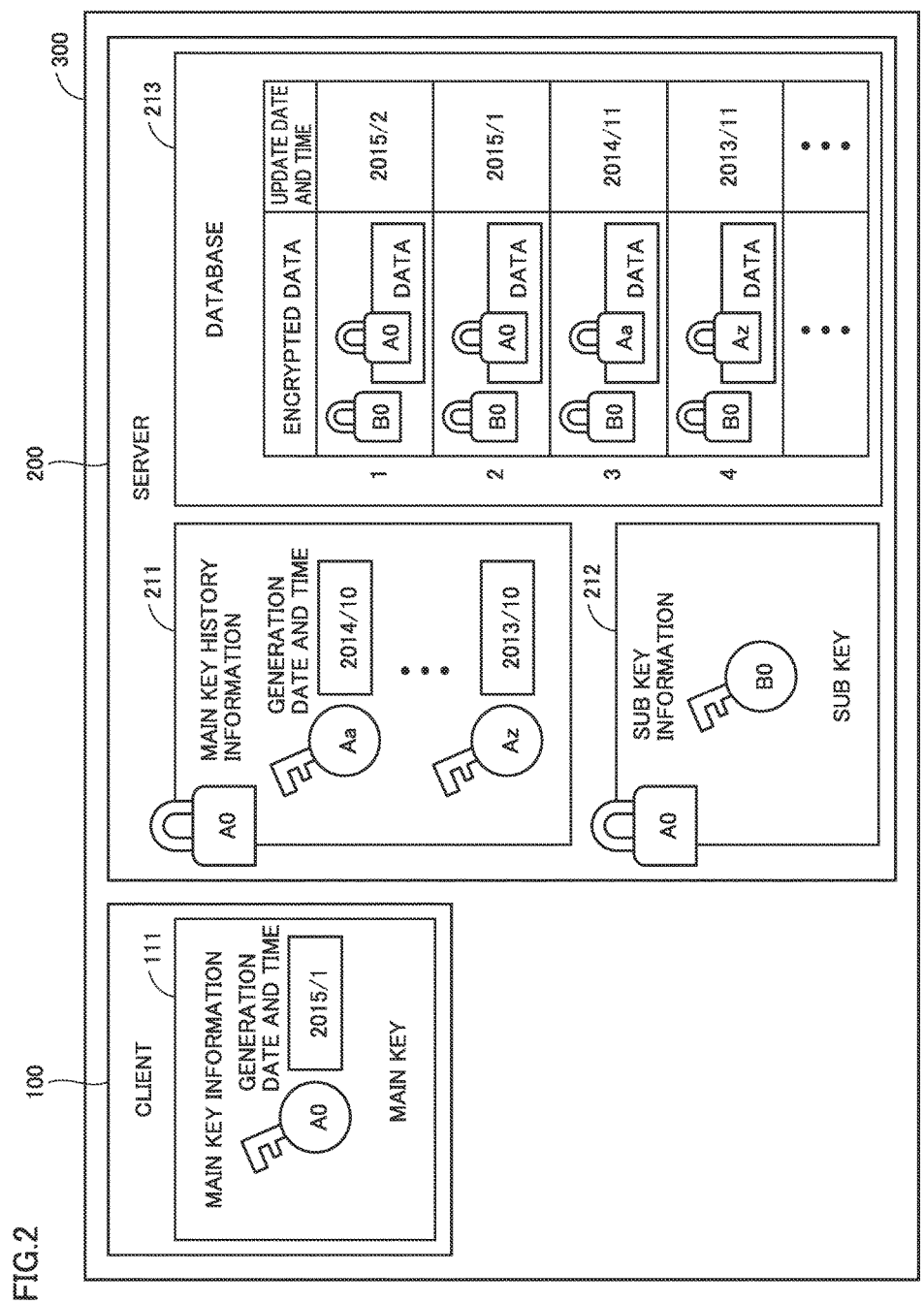
FIG. 2 is a conceptual diagram schematically showing the contents of data which a cryptographic system according to a first embodiment utilizes.

With reference to FIG. 2, the contents of data which cryptographic system 300 according to the first embodiment utilizes will be described. FIG. 2 is a conceptual diagram schematically showing the contents of data which cryptographic system 300 utilizes.

As shown in FIG. 2, cryptographic system 300 includes a client 100 and a server 200 which are connected to each other on a network.

Client 100 includes main key information 111. Main key information 111 is stored in a storage device 110 of client 100, for example (see FIG. 10). Main key information 111 includes information regarding a current main key. In the example of FIG. 2, main key information 111 includes a main key A0 and the creation date and time of main key A0.

Server 200 includes main key history information 211, sub key information 212, and a database 213. Main key history information 211, sub key information 212, and database 213 are stored in server 200 at storage device 210 (see FIG. 10).

Main key history information 211 includes information regarding past main keys. As an example, main key history information 211 includes past main keys Aa-Az and their creation dates and times. Main key history information 211 is encrypted with current main key A0.

Sub key information 212 includes information regarding a current sub key. Sub key information 212 is encrypted with current main key A0. As an example, sub key information 212 includes a sub key B0.

Database 213 includes data to be managed and information regarding the data. The data to be managed is encrypted with a main key and further encrypted with a sub key. As an example, in database 213, encrypted data and the data's update date and time are associated with each other.

Note that where main key information 111, main key history information 211, sub key information 212, and database 213 are stored is not limited to the example of FIG. 2. More specifically, they may be stored anywhere. For example, main key information 111, main key history information 211, and sub key information 212 may be stored in client 100, and database 213 may be stored in server 200.

[Process by Cryptographic System 300]

As a process performed by cryptographic system 300, a key update process, an encryption process, and a decryption process are referred to. Cryptographic system 300 performs the key update process to update a key used in encryption and decryption. Cryptographic system 300 performs the encryption process to encrypt data of plaintext to generate encrypted data. Cryptographic system 300 performs the decryption process to decrypt encrypted data to generate data of plaintext.

Hereinafter, the key update process, encryption process, and decryption process of cryptographic system 300 will be described.

(Key Update Process)

Figure 3:
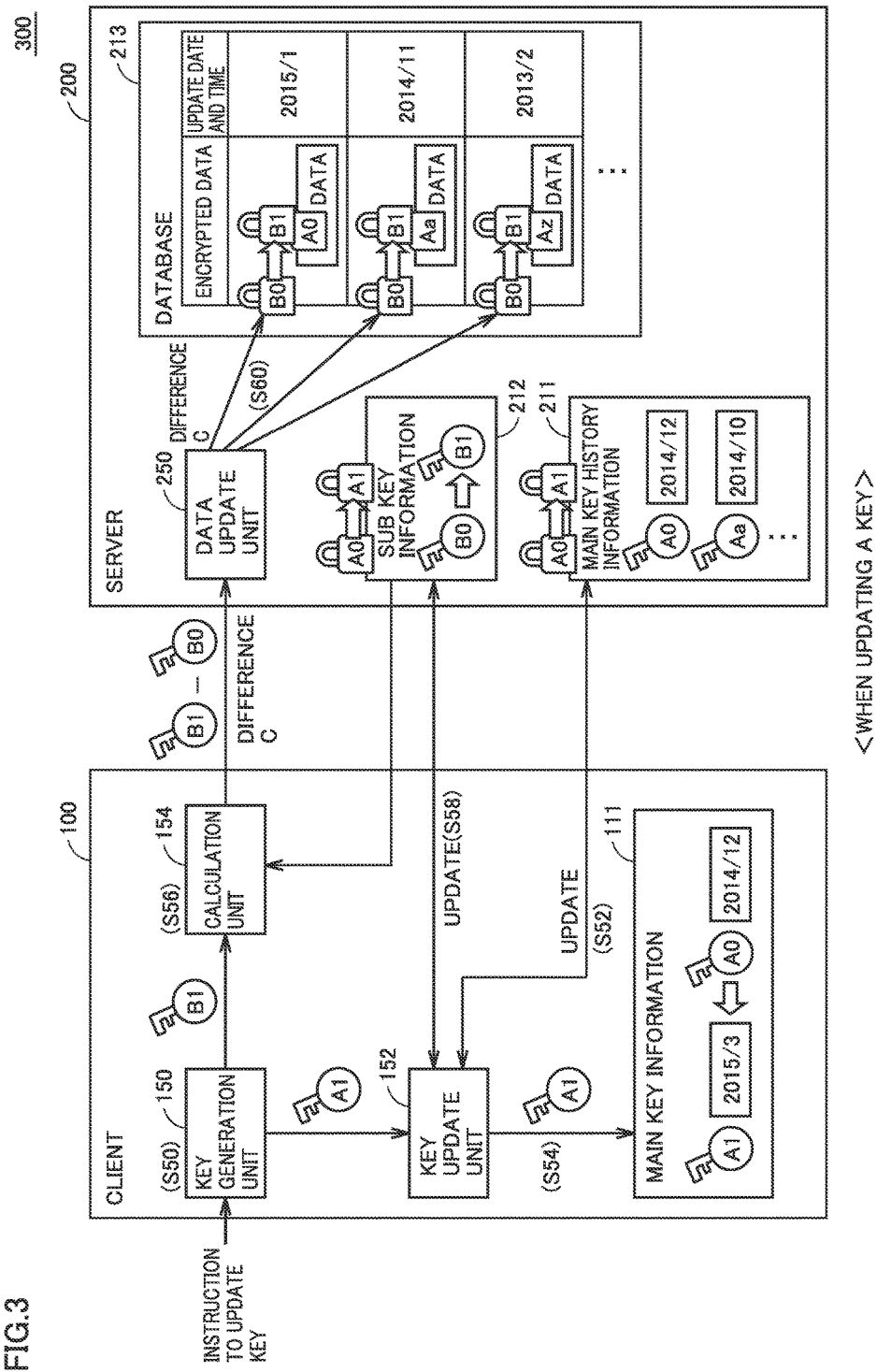
FIG. 3 shows an example of a functional configuration in updating a key in the cryptographic system according to the first embodiment.
Figure 4:
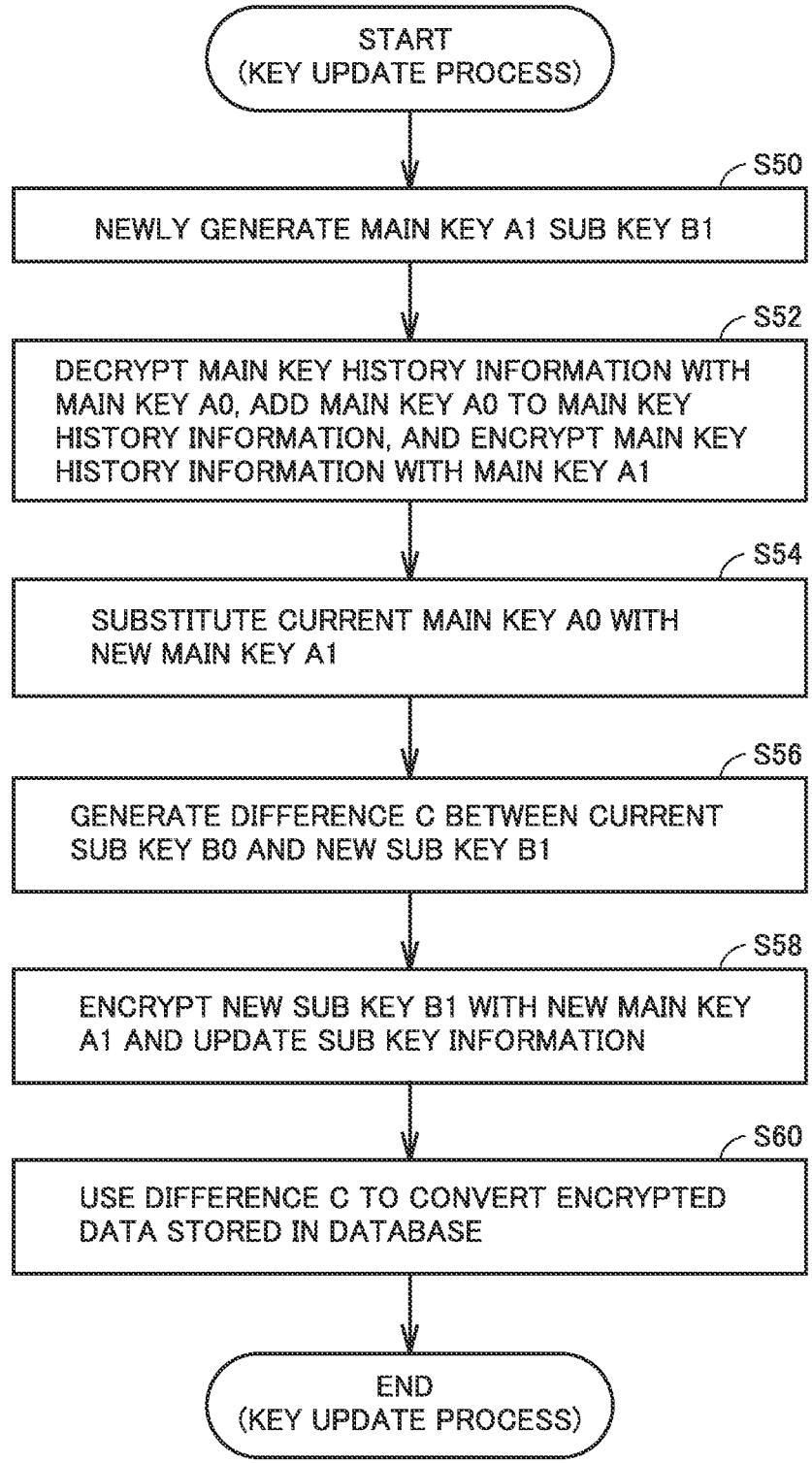
FIG. 4 is a flowchart representing a key update process of the cryptographic system according to the first embodiment.

With reference to FIG. 3 and FIG. 4, the key update process of cryptographic system 300 will be described. FIG. 3 shows an example of a functional configuration of cryptographic system 300 in updating a key. FIG. 4 is a flowchart representing the key update process of cryptographic system 300. The process of FIG. 4 is implemented by a CPU (Central Processing Unit) 102 (see FIG. 10) of client 100 and a CPU 202 (see FIG. 10) of server 200 executing the key update program. In another aspect, the process may partially or entirely be performed by a circuit element or other hardware.

As shown in FIG. 3, client 100 includes a key creation unit 150, a key update unit 152, and a calculation unit 154 as a functional configuration for implementing the key update process. Server 200 includes a data update unit 250.

In step S50, key creation unit 150, in response to an instruction received to update main key A0 and sub key B0, newly creates a main key A1 substituting for current main key A0, and a sub key B1 substituting for current sub key B0. As an example, the instruction to update a key is issued whenever a preset period of time (for example of one day) elapses. Alternatively, the instruction to update a key is issued in response to an operation done for client 100 to update the key. Key creation unit 150 outputs newly created main key A1 to key update unit 152, and also outputs newly created sub key B1 to calculation unit 154.

In step S52, key update unit 152 obtains main key history information 211 from server 200. Main key history information 211 has been encrypted with pre-update, main key A0, and accordingly, key update unit 152 decrypts main key history information 211 with main key A0. Key update unit 152 adds new main key A1 and the creation date and time of main key A1 to main key history information 211 decrypted. Subsequently, key update unit 152 encrypts main key history information 211 with new main key A1 and transmits that main key history information 211 to server 200. Server 200 receives and stores main key history information 211 therein.

In step S54, key update unit 152 updates main key information 111 stored in client 100. More specifically, key update unit 152 substitutes main key A0 included in main key information 111 with new main key A1, and also substitutes the creation date and time of main key A0 included in main key information 111 with the creation date and time of main key A1.

In step S56, calculation unit 154 calculates a difference C between current sub key B0 and new sub key B1. Calculation unit 154 outputs difference C as calculated to data update unit 250.

In step S58, key update unit 152 obtains sub key information 212 from server 200. Sub key information 212 has been encrypted with pre-update, main key A0, and accordingly, key update unit 152 decrypts sub key information 212 with main key A0. Key update unit 152 substitutes sub key B0 included in sub key information 212 with new sub key B1. Subsequently, key update unit 152 encrypts sub key information 212 with new main key A1, and transmits that sub key information 212 to server 200. Server 200 receives and stores sub key information 212 therein.

Once sub key B0 has been updated, data update unit 250 in step S60 converts database 213 encrypted with pre-update sub key B0 into a state encrypted with post-update, new sub key B1. More specifically, data update unit 250 uses difference C to convert database 213 into a state encrypted with sub key B1, rather than decrypting database 213 with sub key B0.

The update process in step S60 will now be more specifically described with reference to a specific example. In one aspect, encryption with a sub key is implemented by bit-shifting data. In that case, a data shifting amount is defined in the sub key. As an example, in sub key B0, a "3-bit rightward shift" is defined as a shifting amount for the sake of illustration. In sub key B1, a "9-bit rightward shift" is defined as a shifting amount for the sake of illustration. In that case, calculation unit 154 calculates sub key B1 minus sub key B0, or a "6-bit rightward shift," as difference C.

Data update unit 250 applies difference C to shift database 213 encrypted with sub key B0 by 6 bits rightwards to bring database 213 into a state encrypted with sub key B1. Thus, data update unit 250 converts database 213 into a state encrypted with post-update, sub key B1, rather than decrypting database 213 with pre-update sub key B0. Thus, data update unit 250 can accelerate a process for converting database 213 when updating a key. As a result, a load on cryptographic system 300 in updating a key is alleviated.

In another aspect, encryption with a sub key is implemented by bit inversion. In that case, in the sub key, a position of a bit to be inverted in 1 byte (i.e., 8 bits) of data is defined. As an example, in sub key B0, "the first bit and the third bit" are defined as an inversion position for the sake of illustration. In sub key B1, "the first bit and the fourth bit" are defined as an inversion position for the sake of illustration. In that case, calculation unit 154 calculates sub key B1 minus sub key B0, or "the third bit and the fourth bit," as difference C.

Data update unit 250 applies difference C to invert data in database 213 for each one byte at the third bit and the fourth bit. Thus, data update unit 250 can convert database 213 into a state encrypted with post-update, sub key B1, without decrypting database 213 with pre-update sub key B0.

Server 200 converts database 213 without using new sub key B1, and sub key B1 will never be leaked to an administrator of server 200. Furthermore, a sub key is frequently updated, and as such, if the administrator of server 200 obtains a past sub key, the administrator cannot decrypt database 213. Accordingly, a risk of the contents of database 213 leaking to the administrator is limited.

Preferably, database 213 before the conversion process and database 213 after the conversion process are equal in data size. Thus, data update unit 250 prevents server 200 from having data increased in size whenever a key is updated.

Still preferably, data update unit 250 deletes difference C after the conversion of database 213. Thus, data update unit 250 can prevent difference C from being accumulated whenever a key is updated, and data update unit 250 can thus prevent server 200 from having data increased in size as a result of the process for updating the key.

(Encryption Process of Cryptographic System 300)

Figure 5:
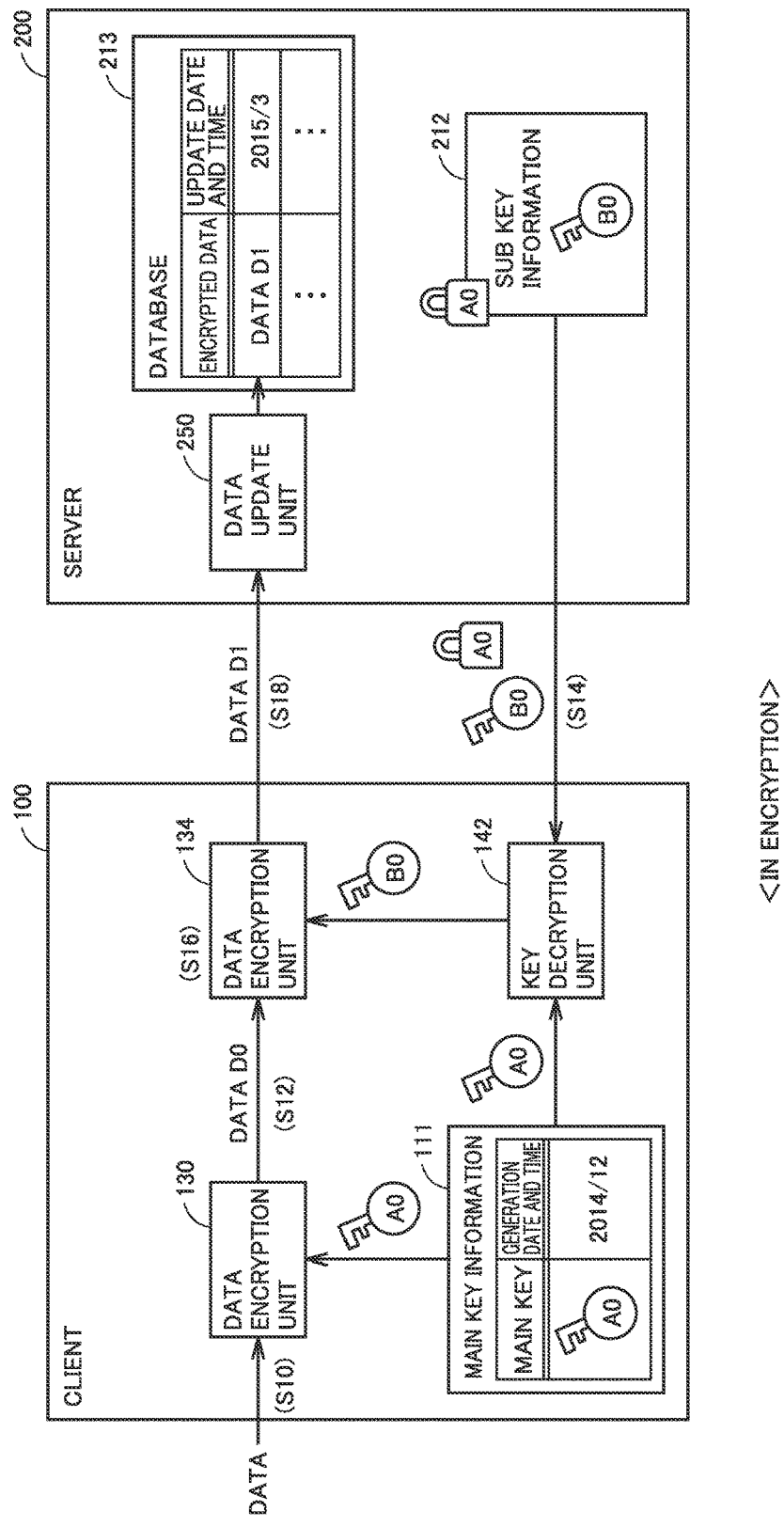
FIG. 5 shows an example of a functional configuration in encryption in the cryptographic system according to the first embodiment.
Figure 6:
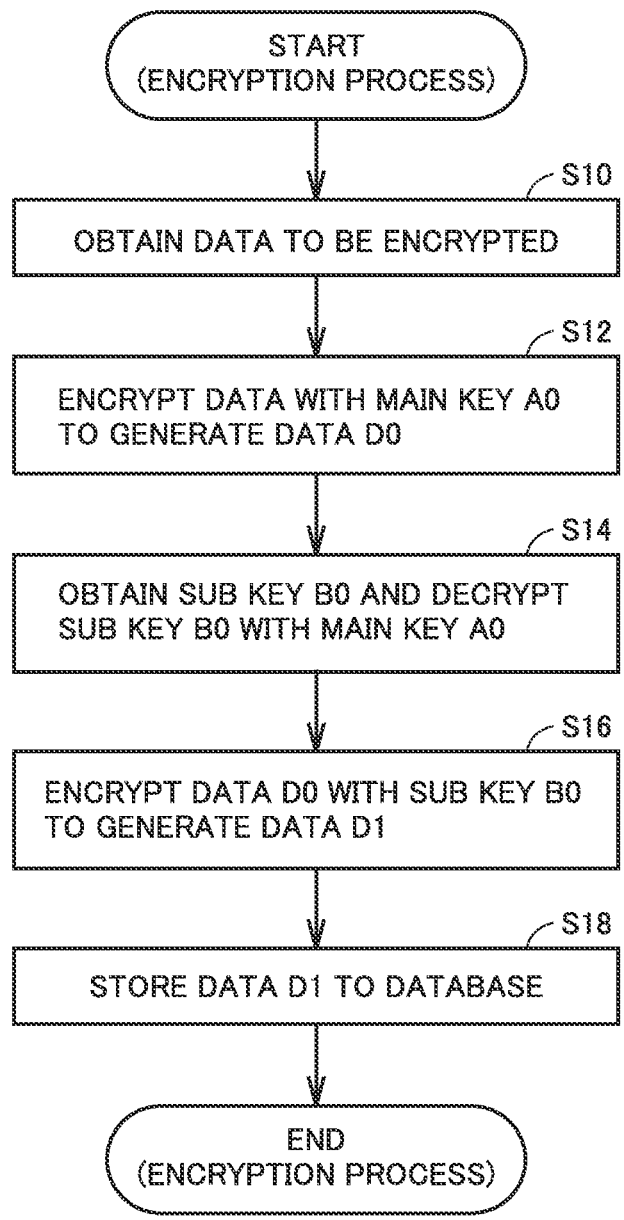
FIG. 6 is a flowchart representing an encryption process in the cryptographic system according to the first embodiment.

The encryption process of cryptographic system 300 will now be described with reference to FIG. 5 and FIG. 6. FIG. 5 shows an example of a functional configuration of cryptographic system 300 in encryption. FIG. 6 is a flowchart representing the encryption process of cryptographic system 300. The process of FIG. 6 is implemented by CPU 102 (see FIG. 10) of client 100 and CPU 202 (see FIG. 10) of server 200 executing an encryption program. In another aspect, the process may partially or entirely be performed by a circuit element or other hardware.

As shown in FIG. 5, client 100 includes a data encryption unit 130, a data encryption unit 134, and a key decryption unit 142 as a functional configuration for implementing the encryption process. Server 200 includes a data update unit 250 as a functional configuration for implementing the encryption process.

In step S10, data encryption unit 130 obtains data to be encrypted. The data to be encrypted is for example data designated by an administrator of client 100. Alternatively, the data to be encrypted is data of a folder previously set in client 100.

In step S12, data encryption unit 130 obtains current main key A0 from main key information 111. Data encryption unit 130 encrypts the data to be encrypted in a first encryption method using main key A0 to generate data D0. Preferably, the first encryption method employs an encryption algorithm having larger encryption reliability than a second encryption method described later. As the first encryption method, AES (Advanced Encryption Standard)-256 bit, RSA (Rivest Shamir Adleman), etc. are referred to, for example. Data encryption unit 130 outputs encrypted data D0 to data encryption unit 134.

In step S14, key decryption unit 142 receives sub key information 212 from server 200. Sub key information 212 has been encrypted with current main key A0, and accordingly, key decryption unit 142 decrypts sub key information 212 with main key A0. Key decryption unit 142 obtains sub key B0 from sub key information 212 decrypted, and outputs that sub key B0 to data encryption unit 134.

In step S16, data encryption unit 134 encrypts data D0 in the second encryption method using sub key B0 to generate data D1. Data encryption unit 134 handles a time at which data D1 is generated as an update date and time, and transmits that date and time and data D1 to server 200.

As an example, an encryption method faster than the first encryption method is adopted as the second encryption method. Preferably, a method allowing a data size to be unchanged between pre-encryption and post-encryption regardless of the type of the sub key, is adopted as the second encryption method. Still preferably, a method capable of calculating a difference between different sub keys is adopted as the second encryption method.

As an example, for the second encryption method, XOR operation, shift operation, a data conversion algorithm based on a conversion table of a small size, etc. are adopted. In XOR operation, data encryption unit 134 generates a random number with a sub key serving as a seed, and determines bit position to be inverted, based on that random number, within one byte. Data encryption unit 134 inverts a bit of data of each one byte of data D0. In shift operation, data encryption unit 134 generates a random number with a sub key serving as a seed, and determines a shifting amount based on that random number. Data encryption unit 134 shifts a bit of data D0 by the determined shifting amount.

In step S18, data update unit 250 stores data D1 and the update date and time received from client 100 to database 213 as one record.

Note that while in the above an example is described in which client 100 performs an encryption process, server 200 may perform the encryption process as long as there is no security problem in a communication path between client 100 and server 200 and data in the encryption process can be kept secret from the administrator of server 200. In other words, the encryption process can be performed by at least one of client 100 and server 200.

(Decryption Process of Cryptographic System 300)

Figure 7:
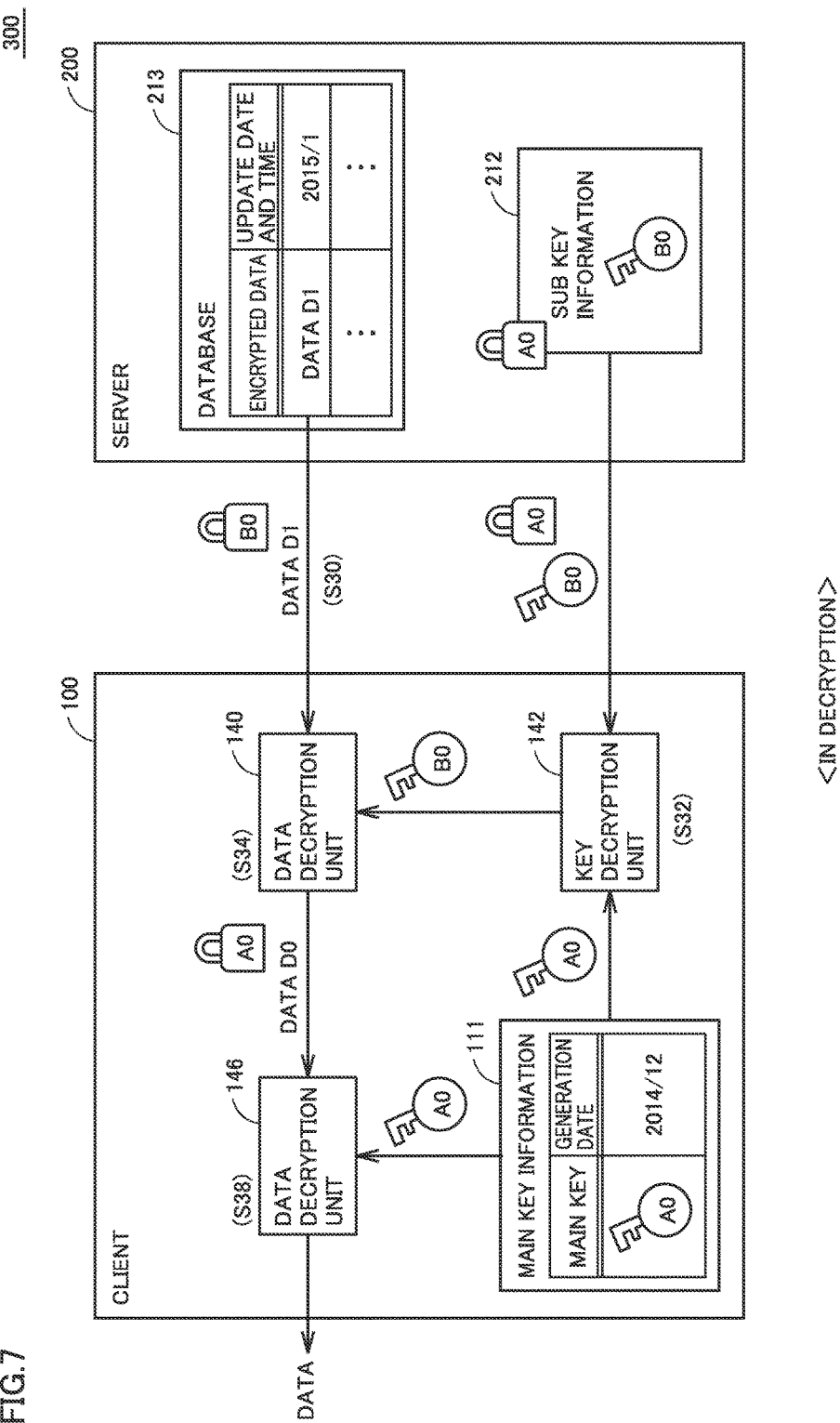
FIG. 7 shows an example of a functional configuration in decryption in the cryptographic system according to the first embodiment.
Figure 8:
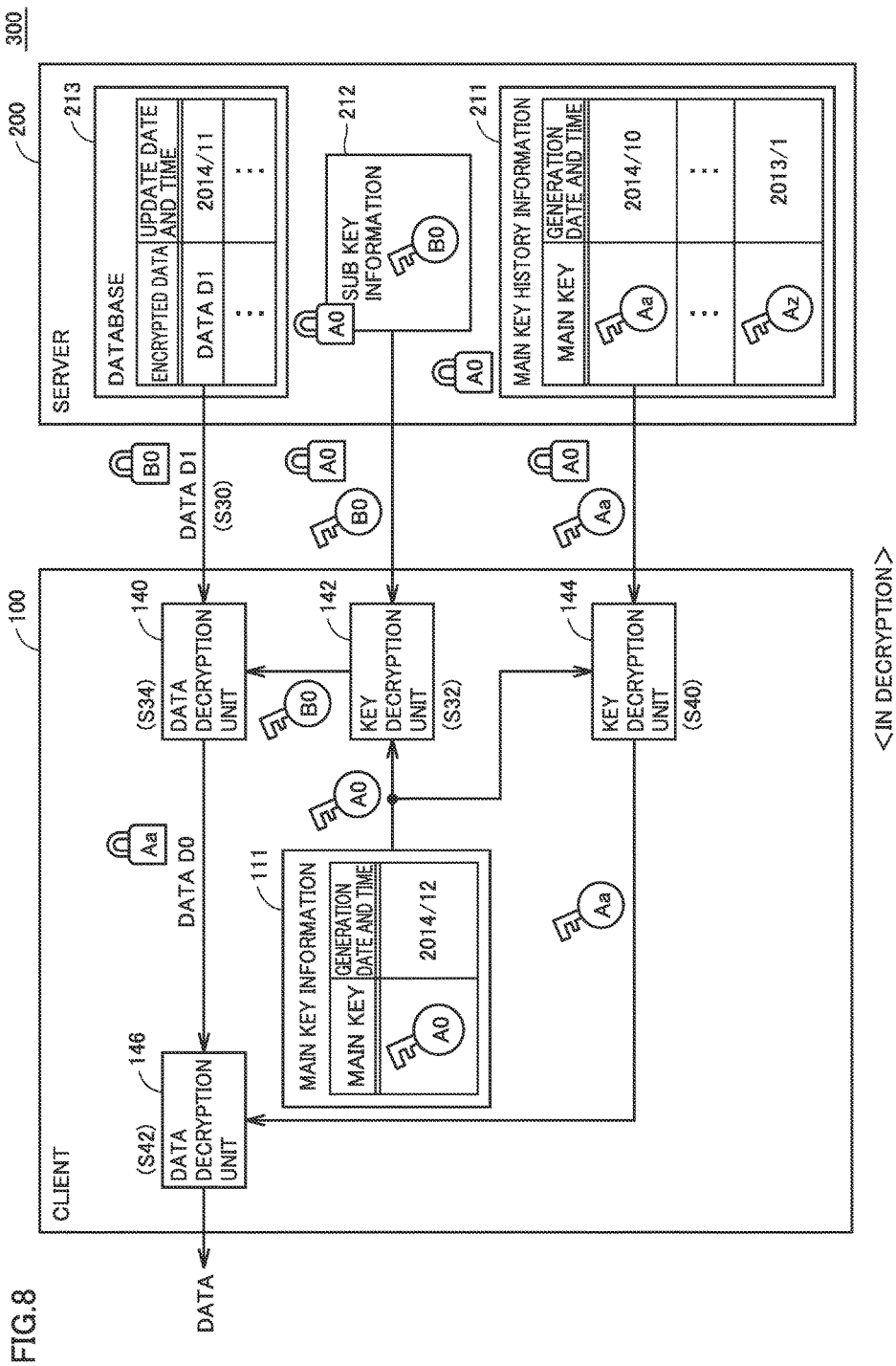
FIG. 8 shows another example of the functional configuration in decryption in the cryptographic system according to the first embodiment.
Figure 9:
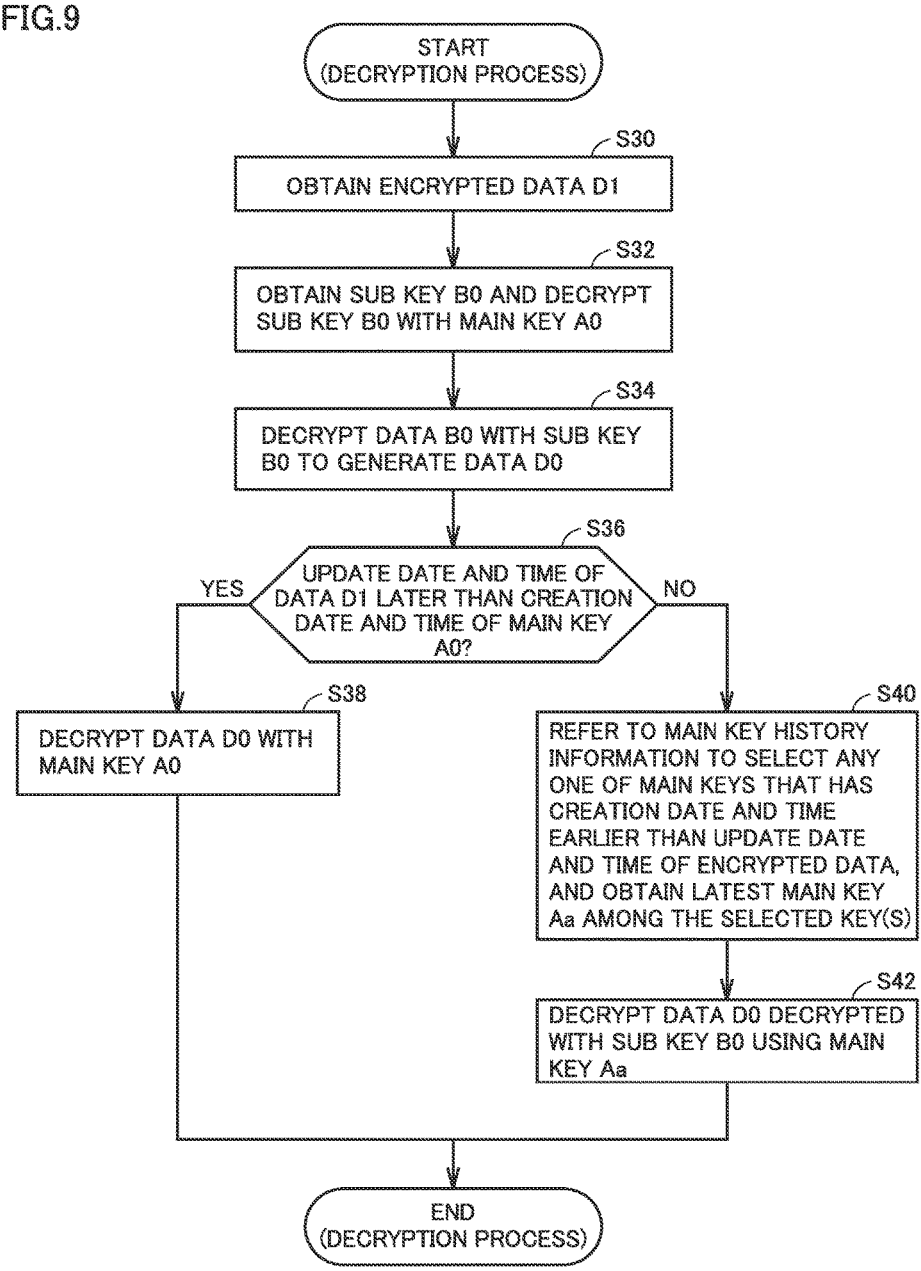
FIG. 9 is a flowchart representing a decryption process in the cryptographic system according to the first embodiment.

A decryption process of cryptographic system 300 will now be described with reference to FIG. 7 - FIG. 9. FIG. 7 shows an example of a functional configuration of cryptographic system 300 in decryption. FIG. 8 shows another example of the functional configuration of cryptographic system 300 in decryption. FIG. 9 is a flowchart representing the decryption process of cryptographic system 300. The process of FIG. 9 is implemented by CPU 102 (see FIG. 10) of client 100 and CPU 202 (see FIG. 10) of server 200 executing a decryption program. In another aspect, the process may partially or entirely be performed by a circuit element or other hardware.

As shown in FIG. 7 and FIG. 8, client 100 includes a data decryption unit 140, a key decryption unit 142, a key decryption unit 144, and a data decryption unit 146 for implementing the decryption process.

In step S30, data decryption unit 140 obtains data D1 to be decrypted and an update date and time of data D1 from database 213 of server 200. Data D1 to be decrypted is for example designated by the administrator of client 100.

In step S32, key decryption unit 142 obtains sub key information 212 from server 200. Sub key information 212 has been encrypted with current main key A0, and accordingly, key decryption unit 142 decrypts sub key information 212 with main key A0 included in main key information 111. Key decryption unit 142 obtains sub key B0 from sub key information 212 decrypted. Key decryption unit 142 outputs sub key B0 to data decryption unit 140.

In step S34, data decryption unit 140 decrypts data D1 encrypted with sub key B0 using sub key B0 to generate data D0. Data decryption unit 140 outputs data D0 to data decryption unit 146.

In step S36, client 100 determines whether the update date and time of data D1 is later than the creation date and time of current main key A0. When client 100 determines that the update date and time of data D1 is later than the creation date and time of current main key A0 (YES in step S36), the control proceeds with Step S38. Otherwise (NO in step S36), the control proceeds with Step S40.

In step S38, data decryption unit 146 obtains main key A0 from main key information 111, and decrypts data D0 with main key A0. Thus, data decryption unit 146 can obtain data of plaintext.

In step S40, key decryption unit 144 obtains main key history information 211 from server 200. Main key history information 211 has been encrypted with current main key A0, and accordingly, key decryption unit 144 decrypts main key history information 211 with main key A0. As a result, a past key and its creation date and time are obtained. The obtained information may be held in client 100 as cache. This allows a subsequent decryption process to be performed fast. Key decryption unit 144 selects any one of main keys included in main key history information 211 that has an earlier creation date and time than an update date and time of encrypted data, and obtains a latest main key Aa among the selected key(s). Key decryption unit 144 outputs main key Aa to data decryption unit 146.

In step S42, data decryption unit 146 decrypts data D0 with main key Aa. Thus data decryption unit 146 decrypts data D1 into data of plaintext with main key Aa created before the update date and time of data D1.

Note that while in FIG. 7 and FIG. 8 an example is described in which client 100 performs a decryption process, server 200 may perform the decryption process as long as there is no security problem in a communication path between client 100 and server 200 and data in the decryption process can be kept secret from the administrator of server 200. In other words, the decryption process can be performed by at least one of client 100 and server 200.

[Hardware Configuration of Cryptographic System 300]

Figure 10:
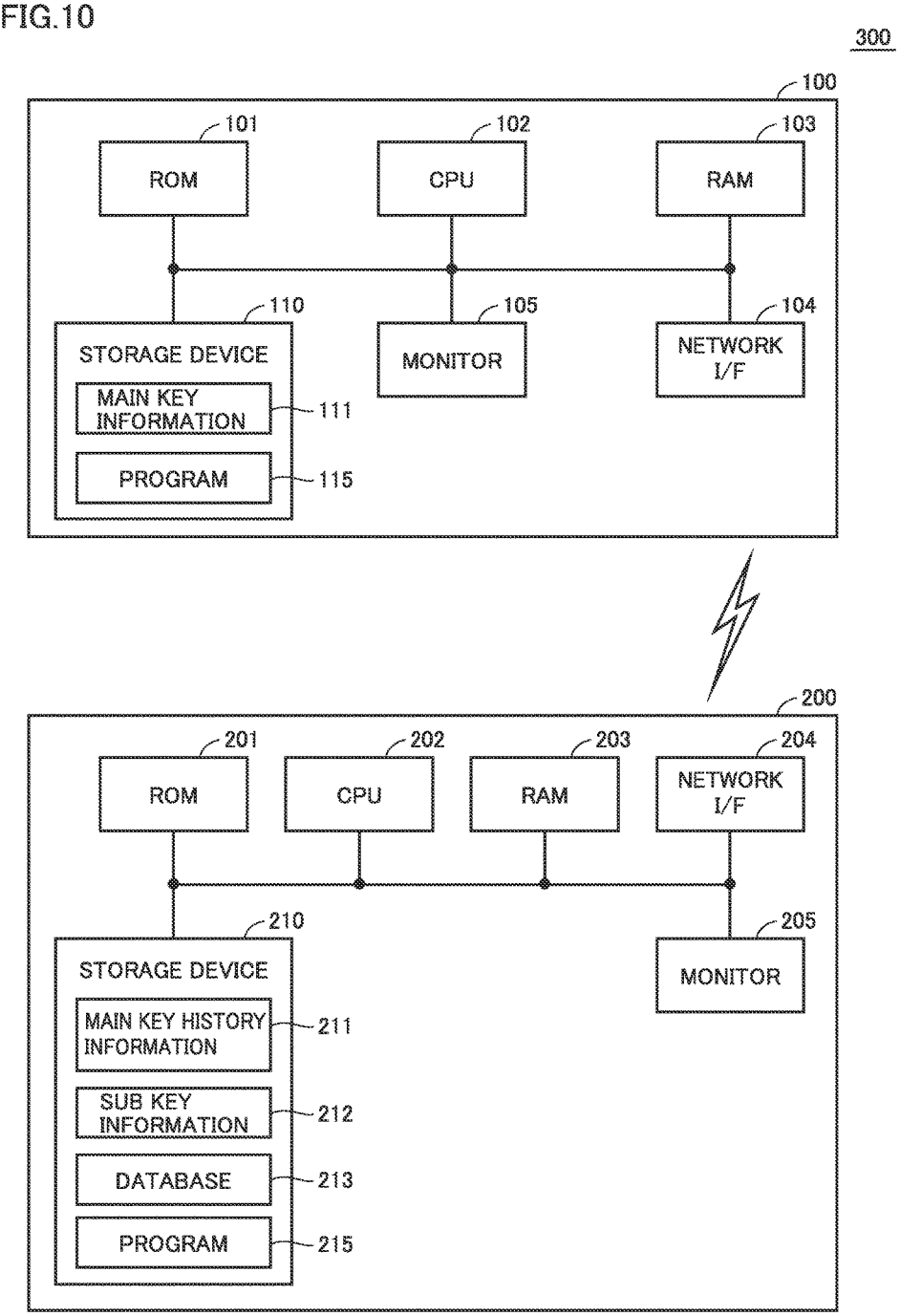
FIG. 10 is a block diagram showing a main hardware configuration of the cryptographic system according to the first embodiment.

With reference to FIG. 10, an example of a hardware configuration of cryptographic system 300 will be described. FIG. 10 is a block diagram showing a main hardware configuration of cryptographic system 300. As shown in FIG. 10, cryptographic system 300 includes client 100 and server 200. Client 100 and server 200 are connected to each other via a network. Hereinafter, a hardware configuration of client 100 and a hardware configuration of server 200 will be described.

(Hardware Configuration of Client 100)

As shown in FIG. 10, client 100 includes a ROM (Read Only Memory) 101, a CPU 102, a RAM (Random Access Memory) 103, a network I/F (interface) 104, a monitor 105, and a storage device 110.

ROM 101 stores therein an operating system of client 100, a control program executed by client 100, etc. CPU 102 runs the operating system and a variety of programs such as the control program of client 100 to control an operation of client 100. RAM 103 functions as a working memory and temporarily stores a variety of data required for executing the programs.

Communication devices such as an antenna, a NIC (Network Interface Card) and the like are connected to network I/F 104. Client 100 transmits/receives data to/from another communication terminal via the communication devices. The other communication terminal includes server 200, another terminal and the like, for example. Client 100 may be configured to be capable of downloading a program 115 via network I/F 104 for implementing a variety of processes according to the present embodiment.

Monitor 105 displays a variety of screens displayed as program 115 is run. Monitor 105 may be combined with a touch sensor (not shown) and may thus be implemented as a touch panel. The touch panel receives an operation for selecting data to be encrypted and data to be decrypted, receives an operation for updating a key, and the like.

Storage device 110 is a storage medium, such as a hard disk and an external storage device, for example. As an example, storage device 110 includes main key information 111, and program 115 according to the present embodiment. Main key information 111 is stored in a main key storage unit which is a prescribed storage area of storage device 110, for example. Program 115 includes an encryption program for implementing encryption of data, a decryption program for implementing decryption of encrypted data, an update program for implementing a process for updating a key used for the encryption process, and the like.

Note that program 115 may not be provided as a single program and may instead be incorporated in a portion of any program and thus provided. In that case, a process according to the present embodiment is implemented in cooperation with that any program. Even such a program which does not include some module also does not depart from the gist of cryptographic system 300 according to the present embodiment. Furthermore, a function provided by program 115 may partially or entirely be implemented by dedicated hardware. Furthermore, client 100 may be configured in a form in which at least a single server implements a process according to the present embodiment, such as what is called cloud services. Furthermore, a function provided by program 115 may partially or entirely be implemented by client 100 and server 200 cooperating with each other.

(Hardware Configuration of Server 200)

Hereinafter, a hardware configuration of server 200 will be described. As shown in FIG. 10, server 200 includes ROM 201, CPU 202, RAM 203, network I/F 204, monitor 205, and storage device 210.

ROM 201 stores therein an operating system of server 200, a control program executed by server 200, etc. CPU 202 runs the operating system and a variety of programs such as the control program of server 200 to control an operation of server 200. RAM 203 functions as a working memory and temporarily stores a variety of data required for executing the programs.

Communication devices such as an antenna, a NIC and the like are connected to network I/F 204. Server 200 transmits/receives data to/from another communication terminal via the communication devices. The other communication terminal includes client 100, another terminal and the like, for example. Server 200 may be configured to be capable of downloading a program 215 via network I/F 204 for implementing a variety of processes according to the present embodiment.

Monitor 205 displays a variety of screens displayed as program 215 is run. Monitor 205 may be combined with a touch sensor (not shown) and may thus be implemented as a touch panel.

Storage device 210 is a storage medium, such as a hard disk and an external storage device, for example. As an example, storage device 210 includes main key history information 211, sub key information 212, database 213, and program 215 according to the present embodiment. Main key history information 211 is stored in a history information storage unit which is a prescribed storage area of storage device 210, for example. Sub key information 212 is stored in a sub key storage unit which is a prescribed storage area of storage device 210, for example. Database 213 is stored in a data storage unit which is a prescribed storage area of storage device 210, for example. Program 215 includes an encryption program for implementing encryption of data, a decryption program for implementing decryption of encrypted data, an update program for implementing a process for updating a key having been used for the encryption process, and the like.

Note that program 215 may not be provided as a single program and may instead be incorporated in a portion of any program and thus provided. In that case, a process according to the present embodiment is implemented in cooperation with that any program. Even such a program which does not include some module also does not depart from the gist of cryptographic system 300 according to the present embodiment. Furthermore, a function provided by program 215 may partially or entirely be implemented by dedicated hardware. Furthermore, server 200 may be configured in a form in which at least a single server implements a process according to the present embodiment, such as what is called cloud services. Furthermore, a function provided by program 215 may partially or entirely be implemented by client 100 and server 200 cooperating with each other.

[Summary]

Thus, according to the present embodiment, when cryptographic system 300 updates a key cryptographic system 300 converts encrypted data encrypted with a pre-update sub key into a state encrypted with a post-update, new sub key. In other words, when cryptographic system 300 updates a key cryptographic system 300 does not need to decrypt encrypted data with a pre-update sub key. This improves the efficiency of the key update process. Furthermore, in decrypting encrypted data, it is not necessary to use a pre-update sub key, and the efficiency of the decryption process is also improved.

Furthermore, encrypted data converted when a key is updated is unchanged in data size between pre-conversion and post-conversion. This can prevent the encryption process from otherwise being inefficient as a data size increases whenever a key is updated.

<Second Embodiment>

[Outline]

Cryptographic system 300 according to a second embodiment deletes data included in database 213 that has passed a depository period of time, and also deletes a main key included in main key history information 211 that has passed a depository period of time. This reduces data volume in cryptographic system 300. The reduced data volume allows the encryption and decryption processes to be performed in a reduced period of time.

The hardware configuration and others of cryptographic system 300 according to the second embodiment are identical to those of cryptographic system 300 according to the first embodiment, and accordingly, will not be describe repeatedly.

[Deletion Process of Cryptographic System 300]

Figure 11:
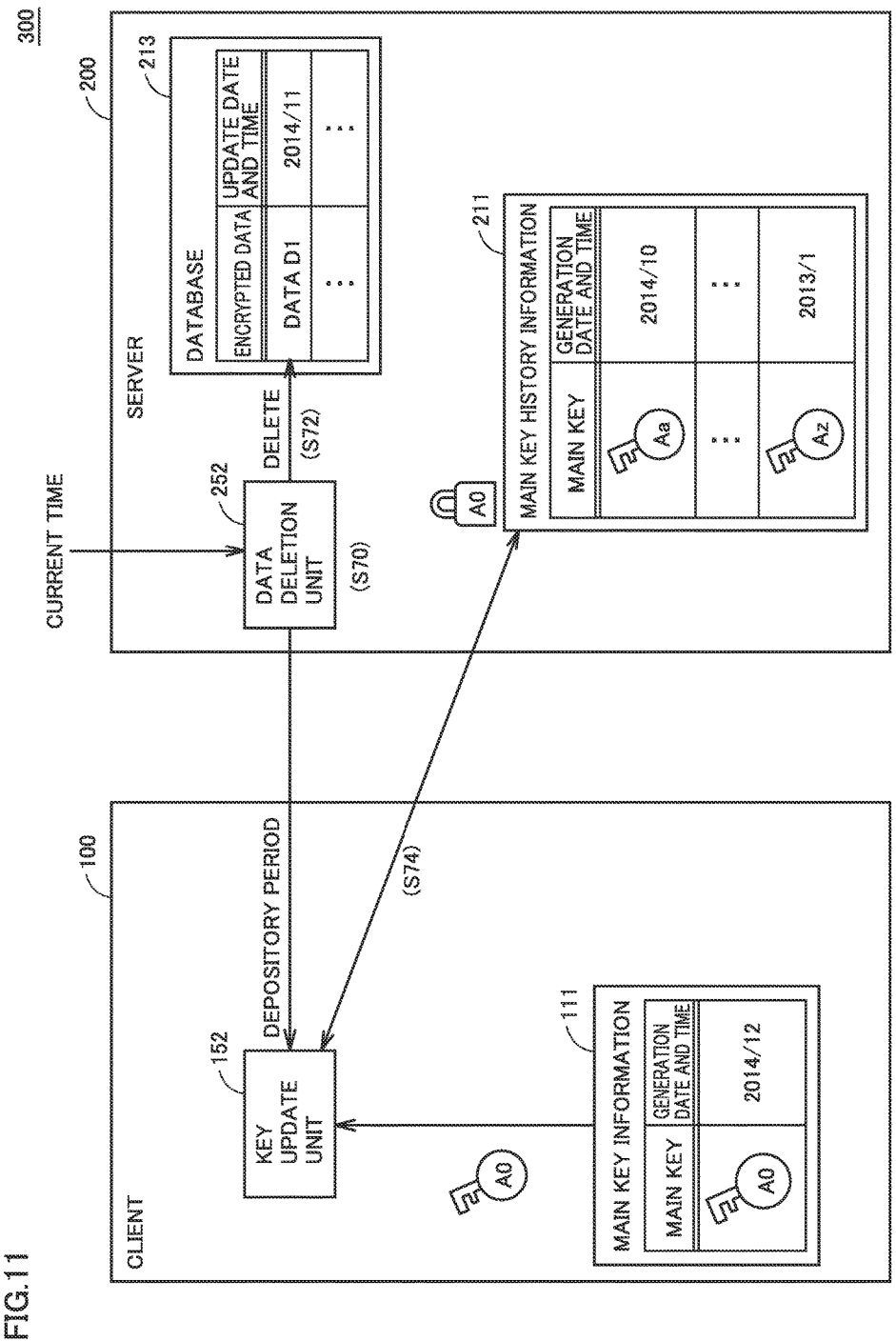
FIG. 11 shows an example of a functional configuration in deleting a key in the cryptographic system according to a second embodiment.
Figure 12:
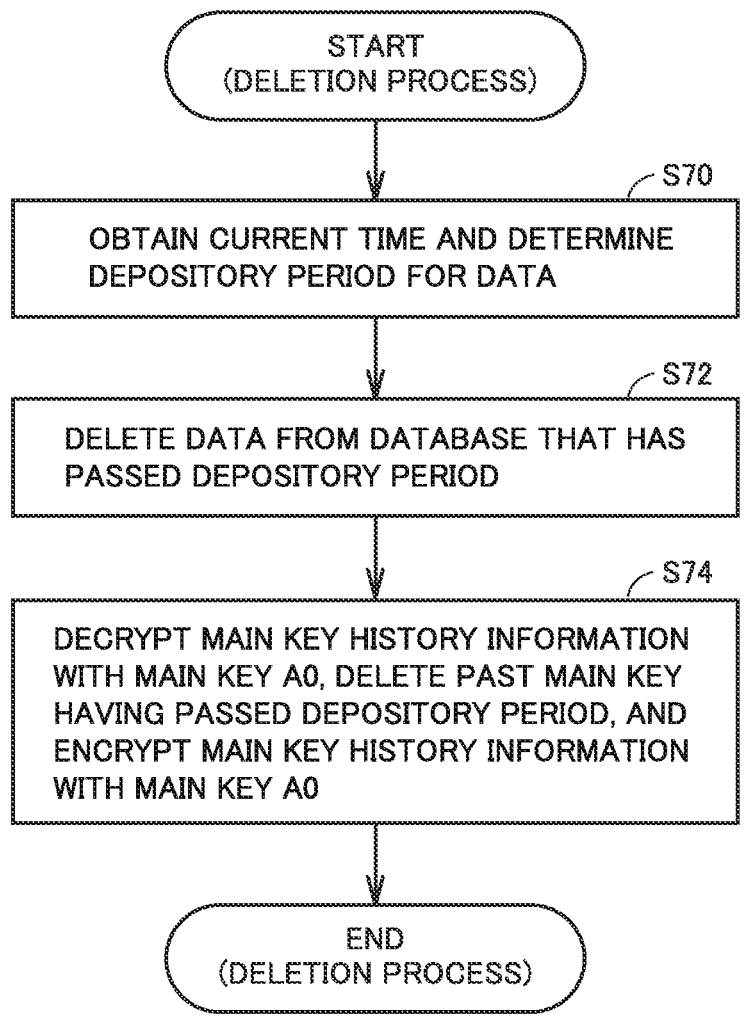
FIG. 12 is a flowchart representing a deletion process in the cryptographic system according to the second embodiment.

A deletion process of cryptographic system 300 will now be described with reference to FIG. 11 and FIG. 12. FIG. 11 shows an example of a functional configuration of cryptographic system 300 in deleting a key. FIG. 12 is a flowchart representing the deletion process of cryptographic system 300. The process of FIG. 12 is implemented by CPU 102 (see FIG. 10) of client 100 and CPU 202 (see FIG. 10) of server 200 executing a program. In another aspect, the process may partially or entirely be performed by a circuit element or other hardware.

As shown in FIG. 11, cryptographic system 300 includes client 100 and server 200. Client 100 includes key update unit 152 as a functional configuration for implementing the deletion process. Server 200 includes a data deletion unit 252 as a functional configuration for implementing the deletion process.

In step S70, data deletion unit 252 obtains a current time, and determines a depository period of time for data. The data depository period of time is a period of time from the current time before a prescribed time (e.g., for one week), for example. The prescribed period of time may be previously set when it is designed, or it may be set by the administrator of client 100, the administrator of server 200, or the like. Data deletion unit 252 transmits the depository period of time to key update unit 152.

In step S72, data deletion unit 252 deletes encrypted data of those included in database 213 that has passed the depository period of time. More specifically, data deletion unit 252 refers to update dates and times associated with the data of database 213, and deletes data having an update date and time that does not fall within the depository period of time. Thus, data deletion unit 252 can prevent database 213 from having an increased data size.

In step S74, key update unit 152 obtains main key history information 211 from server 200. Main key history information 211 has been encrypted with current main key A0, and accordingly, key update unit 152 decrypts main key history information 211 with main key A0. Key update unit 152 deletes a main key included in main key history information 211 having undergone the decryption process, that has passed the depository period of time. More specifically, key update unit 152 refers to creation dates associated with main keys of main key history information 211 and deletes data having a creation date that does not fall within the depository period of time. Thus, key update unit 152 can prevent main key history information 211 from having an increased data size. Key update unit 152 re-encrypts main key history information 211 after the deletion process with current main key A0. Subsequently, key update unit 152 transmits main key history information 211 to server 200. Server 200 receives and stores main key history information 211 therein.

[Summary]

Thus cryptographic system 300 according to the present embodiment deletes from database 213 data that has passed a depository period of time, and cryptographic system 300 also deletes from main key history information 211 a main key that has passed a depository period of time. This can maintain the data size of database 213 and main key history information 211 to be constant and can thus maintain the performance of cryptographic system 300.

While the present invention has been described in embodiments, it should be understood that the embodiments disclosed herein are illustrative and non-restrictive in any respect. The scope of the present invention is defined by the terms of the claims, and is intended to include any modifications within the meaning and scope equivalent to the terms of the claims.

What is claimed is:

1. A cryptographic system, comprising:
   a client device;
   a server;
   a network interface communication between the client device and the server;
   a first encryption unit implemented by the client device for encrypting original data in a first encryption method using a first key to generate first encrypted data;
   a second encryption unit implemented by the client device for encrypting the first encrypted data in a second encryption method using a second key to generate second encrypted data;
   a data storage unit implemented by the server for storing the second encrypted data generated;
   a key update unit implemented by the client device for updating a current version of the first key to a new version of the first key and updating a current version of the second key to a new version of the second key, in response to an instruction received to update the current version of the first key and the current version of the second key; and
   a data update unit implemented by the server for converting, when the current version of the second key is updated, the second encrypted data encrypted with the current version of the second key into a state encrypted with the new version of the second key, via conversion instructions received from the client device via the network interface;
   the data storage unit storing therein the second encrypted data in association with an update data and time of the second encrypted data, the cryptographic system further comprising:
   a history information storage unit for encrypting a past version of the first key and a creation date and time of the first key with the current version of the first key, and storing as history information the past version of the first key and the creation date and time of that first key thus encrypted; and
   a second key storage unit for encrypting the current version of the second key with the current version of the first key and storing the encrypted current version of the second key as second key information
wherein the first encryption unit, the second encryption unit, the data storage unit, a key update unit, a data update unit are implemented by a hardware processor.

2. The cryptographic system according to claim 1, further comprising a calculation unit for calculating a difference between the current version of the second key and the new version of the second key, wherein
the data update unit uses the difference to convert the second encrypted data encrypted with the current version of the second key into a state encrypted with the new version of the second key, without decrypting the second encrypted data with the current version of the second key.

3. The cryptographic system according to claim 2, wherein the data update unit deletes the difference after the second encrypted data is converted.

4. The cryptographic system according to claim 1, wherein the second encrypted data before the conversion process and the second encrypted data after the conversion process are equal in data size.

5. The cryptographic system according to claim 1, wherein the key update unit:
operates, in response to an instruction received to update the current version of the first key, to decrypt the history information with the current version of the first key;
handles the current version of the first key as a past version of the first key and adds that first key and that first key's creation date and time to the history information; and
encrypts the history information with the new version of the first key.

6. The cryptographic system according to claim 1, wherein the key update unit:
operates, in response to an instruction received to update the current version of the second key, to decrypt the second key information with the current version of the first key;
substitutes with the new version of the second key the current version of the second key included in the second key information after the decryption process; and
encrypts the second key information after the substitution process with the new version of the first key.

7. The cryptographic system according to claim 1, further comprising a deletion unit for deleting the second encrypted data in response to the second encrypted data having an update date and time having passed a depository period of time, wherein the key update unit:
decrypts the history information with the current version of the first key in response to the second encrypted data having been deleted;
deletes a past version of the first key included in the history information after the decryption process that has passed the depository period of time; and
again encrypts the history information after the deletion process with the current version of the first key.

8. The cryptographic system according to claim 1, further comprising:
a first decryption unit for decrypting the second encrypted data to the first encrypted data with the second key; and
a second decryption unit for decrypting the first encrypted data to the original data with a first key having a creation date and time earlier than the update date and time of the second encrypted data.

9. The cryptographic system according to claim 1, further comprising the client device and the server connected to each other via a network, wherein:
the client device includes a first key storage unit for storing the current version of the first key; and
the server includes the second key storage unit, the history information storage unit, and the data storage unit.

10. The cryptographic system according to claim 1, further comprising the client device and the server connected to each other via a network, wherein:
the client device includes a first key storage unit for storing the current version of the first key, the second key storage unit, and the history information storage unit; and
the server includes the data storage unit.

11. The cryptographic system according to claim 9, wherein a process for encrypting the original data to the second encrypted data and a process for decrypting the second encrypted data to the original data are performed by at least one of the client device and the server.

12. A method for updating a key for use with a system comprising a client device, a server, and a network interface for communication between the client device and the server, the method comprising:
encrypting original data at the client device in a first encryption method using a first key to generate first encrypted data;
encrypting the first encrypted data at the client device in a second encryption method using a second key to generate second encrypted data;
storing, at the server, the second encrypted data generated;
in response to an instruction received to update a current version of the first key and a current version of the second key, updating, at the client device, the current version of the first key to a new version of the first key and also updating the current version of the second key to a new version of the second key; and
when updating the current version of the second key, converting the second encrypted data encrypted with the current version of the second key into a state encrypted with the new version of the second key, via conversion instructions received from the client device via the network interface;
the server storing therein the second encrypted data in association with an update data and time of the second encrypted data, and the method further comprising:
encrypting a past version of the first key and a creation date and time of the first key with the current version of the first key, and storing as history information the past version of the first key and the creation date and time of that first key thus encrypted; and
encrypting the current version of the second key with the current version of the first key and storing the encrypted current version of the second key as second key information.

13. A non-transitory storage medium encoded with a computer readable program for use with a system comprising a client device, a server, and a network interface for communication between the client device and the server, the computer readable program, when executed, causing a computer to:
encrypt original data at the client device in a first encryption method using a first key to generate first encrypted data;

encrypt the first encrypted data at the client device in a second encryption method using a second key to generate second encrypted data;

store, at the server, the second encrypted data generated;

in response to an instruction received to update a current version of the first key and a current version of the second key, update, at the client device, the current version of the first key to a new version of the first key and also update the current version of the second key to a new version of the second key; and when updating the current version of the second key, convert the second encrypted data encrypted with the current version of the second key into a state encrypted with the new version of the second key, via conversion instructions received from the client device via the network interface;

the server storing therein the second encrypted data in association with an update data and time of the second encrypted data, the computer readable program further causing the computer to:

encrypt a past version of the first key and a creation date and time of the first key with the current version of the first key, and store as history information the past version of the first key and the creation date and time of that first key thus encrypted; and encrypt the current version of the second key with the current version of the first key and store the encrypted current version of the second key as second key information.

\* \* \* \* \*